(12) United States Patent
Elden

(10) Patent No.: US 7,316,407 B1
(45) Date of Patent: Jan. 8, 2008

(54) ROLLING TRANSPORT WITH REMOVABLE CARRYING BAG AND FOLD-UP SEAT

(76) Inventor: Richard Elden, 845 Sandhill AV, Carson, CA (US) 90746

(*) Notice: Subject to any disclaimer, the term of this patent is extended or adjusted under 35 U.S.C. 154(b) by 0 days.

(21) Appl. No.: 11/703,987

(22) Filed: Feb. 8, 2007

(51) Int. Cl.
B62B 5/02 (2006.01)

(52) U.S. Cl. ............... 280/47.25; 280/32.5; 280/47.19; 280/47.35; 280/47.38; 280/47.17; 280/63; 280/47.131; 280/47.34; 280/124.12; 280/137.501; 280/47.24

(58) Field of Classification Search ............ 280/47.25, 280/47.24, 32.5, 47.19, 47.35, 47.38, 47.17, 280/63, 47.131, 47.34, 124.12, 137.501
See application file for complete search history.

(56) References Cited

U.S. PATENT DOCUMENTS 2,132,069 A * 10/1938 Hall ..................... 280/5.22
2,362,721 A * 11/1944 Reynolds .................. 5/626
2,715,533 A * 8/1955 Strausburg ................ 280/5.22
2,742,973 A * 4/1956 Johannesen ................ 180/8.2
2,957,700 A * 10/1960 Beaurline ................ 280/47.19
6,561,524 B1 * 5/2003 Medina .................... 280/5.22

* cited by examiner

Primary Examiner—Christopher P. Ellis
Assistant Examiner—Cynthia F. Collado
(74) Attorney, Agent, or Firm—Donald W. Meeker

(57) ABSTRACT

A combination rolling transport and fold-up seat has a detachable carry bag of waterproof, reinforced fabric, detachable snap-on wheels, and collapsible frame. The frame has a stabilizing element that allows it to stand upright and support either items on the load-bearing transport side or a person seated in the fold-up seat. A carry bag back mounting sheet forms a tube slipped over the main frame member to support the carry bag and act as a back rest for the seat. Pop-off wheels enable the flat folded up frame members to fit into a minimal storage space.

9 Claims, 5 Drawing Sheets

ROLLING TRANSPORT WITH REMOVABLE CARRYING BAG AND FOLD-UP SEAT

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to two wheeled transport devices and in particular to a combined fold-up two wheeled transport or carrier and seat unit which may be used primarily as a transport for conveying a load, with auxiliary fold-up seating means for enabling a user to rest in a seated position, and a removable storage bag which when removed exposes a fold-up bag-supporting ledge which can them be used as a carrying ledge when used as a transport device.

2. Description of Related Art Including Information Disclosed Under 37 CFR 1.97 and 1.98

During any type of outing including shopping, picnics, beaching, camping, outdoor events, or any other outdoor activity, there are always things to carry, which would best be accomplished by a wheeled carrier. Sometimes the items to be carried are small, such as purchased items, food, towels, blankets or other items, requiring something to put them into for transporting. Other items, such as boxes, coolers, or other large heavy items, require a support to rest the large items on a rolling transporter. Furthermore there is always a need for outdoor seating in the same outdoor situations. A heavy duty rolling transporting means can often be heavy and not versatile enough for all of the tasks at hand. Furthermore, storage of such rolling transporters is also a problem. Prior art devices have not adequately addressed these problems.

U.S. Pat. No. 4,846,486, issued Jul. 11, 1989 to Hobson, shows a combined trolley and seat unit that has an inverted U-shape main frame with principal frame side members carrying ground-engaging wheels and having a main frame support rigidly fixed thereto and to a projecting bag support which carries the lower end of a bag the upper end of which is hooked by a pocket over a hook. A folding seat frame having a U-shape leg frame is pivotally carried on the main frame on the side thereof remote from the bag-like container and is movable between a folded position lying substantially parallel to the main frame and an unfolded position in which a front leg frame to which the seat frame is attached contacts the ground and the wheels are spaced from the ground to allow the unit to be used as a seat with no risk of rolling movement.

U.S. Pat. No. 5,161,811, issued Nov. 10, 1992 to Cheng, discloses a trolley with a foldable seat assembly. The trolley includes a main frame, a wheel device, a support frame attached to a front side of the main frame, and a foldable seat assembly attached to a rear side of the main frame. When the seat assembly is in an extended status, a second pair of stands secured to a first pair of stands contact the ground with the wheel device to provide a support for a seat device. When the seat assembly is in a folded status, the first and second pairs of stands fold close to the main frame.

U.S. Pat. No. 4,824,167, issued Apr. 25, 1989 to King, is for a combination chair and luggage carrier disposable in an unfolded position for use wherein it may function as a conventional chair or fishing chair, and in a folded position for use as a luggage carrier. The device is defined by a pair of U-shaped metal tubular members which are pivotally connected together, with one member having a pair of legs provided with wheels and angled end portions. The end portions engage the ground in the unfolded position and the wheels engage the ground in the folded position. The other member includes a U-shaped portion which functions as a chair back in the unfolded position and a handle in the folded position. A flexible seat with attached storage pocket, fishing pole support bracket and article support rack are also provided.

U.S. Pat. No. 5,505,471, issued Apr. 9, 1996 to Cheng, indicates a trolley with retractable wheels and a seat. The trolley comprises a pair of vertical bars, a pair of linking bars, and a wheel assembly operable by the linking bars to pivotally move between an extended and a retracted positions. A movable block slidable on the vertical bars is connected with the linking bars. A positioning plate is fixedly mounted on the movable block and a sliding movement of the movable block relative to the vertical bars is controlled by a biasing unit in cooperation with the positioning plate. A respective compression spring is additionally provided on the vertical bars to facilitate the sliding movement of the movable block when the movable block is released to move.

U.S. Pat. No. 5,306,027, issued Apr. 26, 1994 to Cheng, puts forth a trolley with a seat and a retractable wheel assembly. The trolley includes a pair of vertical bars defining a pair of legs at lower ends thereof, a supporting plate attached to the lower ends of the vertical bars for carrying articles, such as a golf bag, a sleeve securely mounted to an upper portion of the vertical bars, a lever pivotally mounted to the sleeve, a bracket member mounted on the vertical bars, a pair of arms extending outward from the bracket member and away from the supporting plate and each has a first end pivotally connected to the bracket member and a second end pivotally connected to a connecting member, a linking bar with first end thereof pivotally connected to the lever and a second end thereof pivotally connected to the connecting member, and a wheel removably attached to each connecting member. When pulling down the lever from a lifted position to a lowered position, the wheels move inward and downward onto the ground for supporting the trolley and the article there-on.

U.S. Pat. No. 5,374,073, issued Dec. 20, 1994 to Hung-Hsin, concerns a tractive baggage handcart comprising a travel case, a tractive retractable device on the back of said travel case, a base retractable device on the bottom of said travel case, a tie belt and a foldable chair, wherein the tractive retractable device is provided with telescopic upper, middle and lower retractable pipes for shortening or lengthening the vertical dimension of the handcart. An extensible shelf is slidably mounted on the underside of the base for supporting a second travel case in front of the travel case positioned on the base. The tie belt can be extended around the two travel cases to retain them as a unitary package on the handcart. A foldable chair is provided that consists essentially of a seat platform, a movable frame or bracket, a movable leg, an upper support strut and two lower support struts U.S. Pat. No. 4,290,625, issued Sep. 22, 1981 to Barriere, illustrates a foldable luggage carrying device which has relatively moveable frame members which enable the device to be convertible into multiple positions for different uses. When used as a luggage carrier a second frame member is moved into position as an extension of the first frame member and luggage is carried on a luggage support at the bottom of the first frame member. The second frame member includes a seat unit and seat back so that if desired a user can place a support or prop on the ground so that the second frame member will be perpendicular to the first frame member to form a seat. If it is desired to carry the unit without luggage, the frame elements are moved into an inoperative position such that the support and both frame members are collapsed and locked together. This results in a compact and easy to carry unit.

U.S. Pat. No. 5,542,740, issued Aug. 6, 1996 to Chang, is for a chair and hand truck comprising a seat, a cross frame and a back frame with a back cushion, the seat having hangers for pivotal members to combine the cross frame with the seat and a bolt holes for a pivotal member to combine the back frame with the seat in a right angle, the cross frame having a U-shaped rod frame and a rectangular rod frame pivotally combined together like an X, the cross frame possible to become feet of a chair or a pull rod of a hand truck when it is transformed in different ways.

U.S. Pat. No. 5,062,650, issued November 1991 to Chang, shows a multi-function chair comprising a fore and a hind leg pivotally combined together and adapted to be altered to become a chair or a light duty truck or to be folded up to become a small dimension for storing away.

U.S. Pat. No. 3,930,662, issued Jan. 6, 1976 to Manner, provides a chair and hand truck combination comprising a platform upon which a load may be set and removed, a pair of wheels partially supporting the platform, a back rest extending upwardly from the platform, and a pair of arm rests extending above the platform from the back rest.

U.S. Pat. No. 5,669,659, issued Sep. 23, 1997 to Dittmer, claims a platform assembly and wheel assembly for retro-fitting a folding chair to form a combination chair and hand truck. The platform assembly is removably attached to the bottom section of the pair of leg members forming the front legs of the folding chair. Similarly, the wheel assembly is removably attached to the bottom section of the pair of load support members forming the back legs of the folding chair. The wheel assembly includes a plurality of brackets for removably attaching the wheel assembly to the pair of upright support members, an axle fixedly attached to the plurality of brackets, and a pair of wheels rotatably connected to opposite ends of the axle. The platform assembly includes a lift member, a transverse platform and a plurality of elongated right and left channels extending vertically from the lift member or clamps for removably attaching the platform assembly to the front legs of the folding chair. When the combination chair and hand truck is folded in an open position, it will function as a chair. When the combination chair and hand truck is folded in a closed position, it will function as a hand truck.

U.S. Pat. No. 2,472,407, issued Jun. 7, 1949 to David, describes a folding cart, a main elongated U-shaped back frame having a handle, wheels attached to the lower end portion of said frame, a seat frame of U-shaped form having one end portion pivotally mounted between intermediate portions of the frame members of the first named frame, a third U-shaped leg frame, the arms thereof being rigid and pivotally connected to the free ends of the arms of the second named seat frame, connecting links between and connected with the first and the third one end to the first named frame and at the opposite end to a rod carried by interconnected portions of the second and third named frames.

U.S. Pat. No. 3,997,213, issued Dec. 14, 1976 to Smith, claims a collapsible carryall with seat wherein tubular assemblies are interpivotally connected so as to form a stable seat when the assemblies are pivoted into an expanded position but form a wheeled carryall when in the collapsed position. One assembly cooperates with the other assemblies to provide a seat back when in the expanded position and likewise provides a gripping handle for manual movement when the assemblies are in the collapsed position. A second of the assemblies has wheels attached thereto which are pivoted out of engagement with the surface when in the expanded position but pivoted so as to provide wheeled engagement with the surface when the assemblies are interpivotally collapsed. The third assembly cooperates with the wheeled assembly to provide the seating arrangement in the expanded configuration and the carryall portion when in the collapsed configuration.

What is needed is a combination rolling transport and seat having a fold-up vertical frame on wheels with fold-up seat on one side and a fold-up protruding bottom support on the other side for receiving alternately large heavy items placed on the bottom support for transport and a removable carrying bag for carrying items with the bag resting on the bottom support and a back wide sleeve hooked over the frame to secure the bag to the frame and to act as a back rest for the fold-up seat, wherein the wheels are large diameter wheels with shock absorbing rubber tires on rims, the wheels being snapped onto the bottom of the frame for transport and snapped off of the frame for storage with the frame folded flat.

BRIEF SUMMARY OF THE INVENTION

An object of the present invention is to provide a combination rolling transport and seat having a fold-up vertical frame on wheels with fold-up seat on one side and a fold-up protruding bottom support on the other side for receiving alternately large heavy items placed on the bottom support for transport similar to a hand cart or dolly and a removable carrying bag for carrying items placed in the bag with the bag resting on the bottom support and a back wide sleeve hooked over the frame to secure the bag to the frame and to act as a back rest for the fold-up seat, wherein the wheels are large diameter wheels with shock absorbing rubber tires on rims, the wheels being snapped onto the bottom of the frame for transport and snapped off of the frame for storage with the frame folded flat.

Another object of the present invention is to provide a combination rolling transport with a fold-up seat that can be easily locked into place with a pivoting hook and protruding means to lock the seat to the frame in the fold-up position for use in transporting items and for storage so that the seat will not fold out by accident during use of the hand transport for other purposes.

In brief, the present invention has a plurality of functions including a combined rolling hand transport device with a soft grip shock absorbing handle on a fold-up frame and a fold-up protruding bottom support for carrying items stacked on the bottom support, a fold-up seat on the opposite side of the frame from the bottom support to serve as an outdoor seat, a carrying bag with a carrying handle and stiff internal support frame, the bag alternately carried separately and supported by the bottom support for transporting items stored in the bag, a mounting loop of material on the back of the bag which slides over the upper frame to support the bag in an upright position and serve as a back rest for the fold-up seat, large resilient rubber-like rimmed tires for shock absorption and passage over uneven terrain, which wheels pop off and the bag is removable for storage of the frame folded flat, and a fold-up resting frame angled downwardly from the main frame to rest on the ground so that the device will stand alone in an upright position, the resting frame attached to and supporting the bottom support.

The present invention has many uses including wheeling groceries carried in the bag after shopping, wheeling supplies and food for picnics, beaching camping, sports, and other outdoor events, a convenient portable wheeled seat for outdoor events, a hand transport for moving loads with the bag removed, and many other functions.

An advantage of the present invention is that it provides a combination rolling transport and fold-up seat with a removable carry bag that, when attached, provides a backrest for the chair.

Another advantage of the present invention is that it provides a combination rolling transport and fold-up seat that folds flat to a depth of 4 inches to occupy minimal storage space.

An added advantage of the present invention is that it provides a combination rolling transport with a fold-up seat that is easily locked in place in the folded position to prevent accidental unfolding of the seat during transporting and storage usage.

An ensuing advantage of the present invention is that it provides a combination rolling transport and portable chair that is lightweight and easy to use.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings.

DETAILED DESCRIPTION OF THE INVENTION

Figure 1:
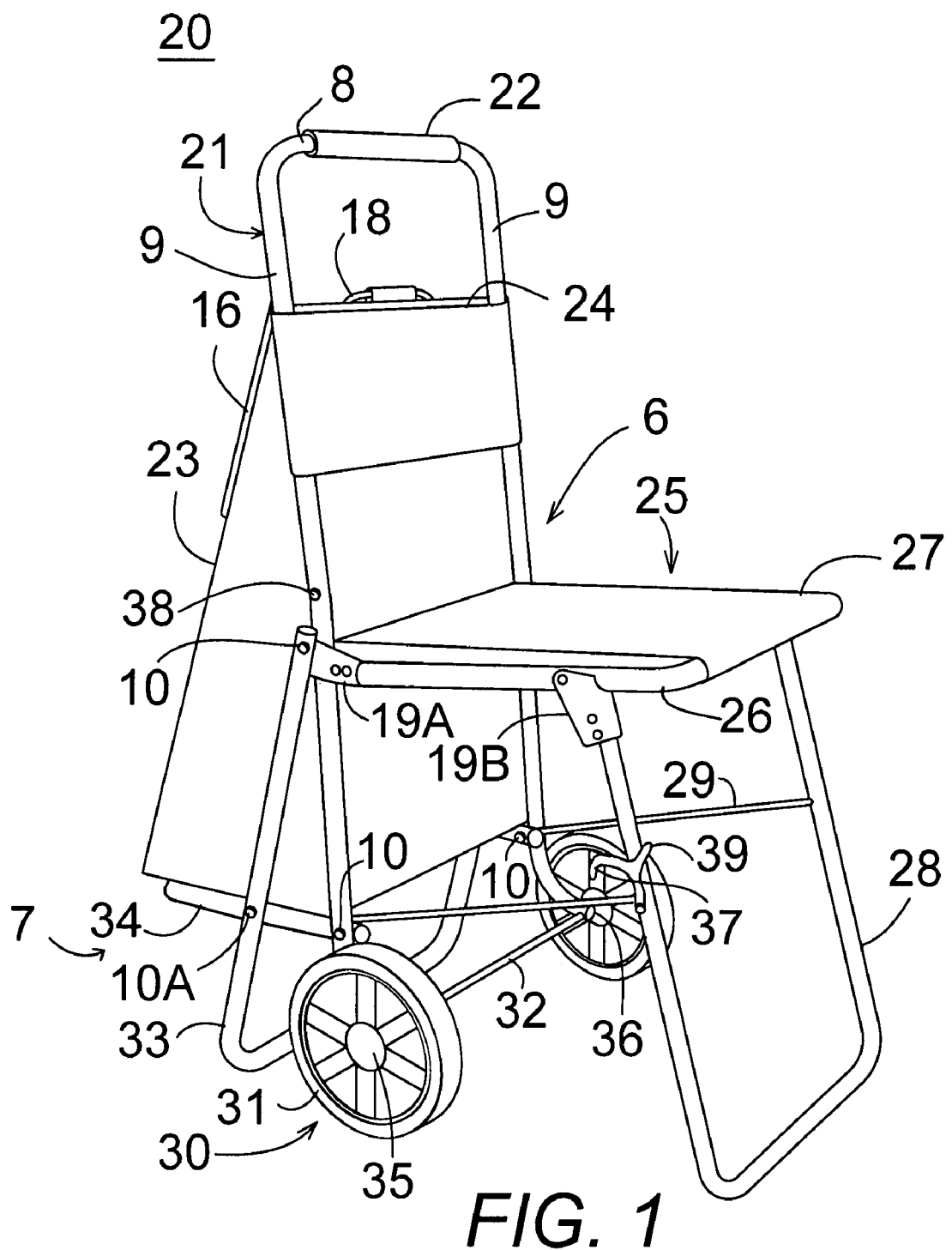
FIG. 1 is a perspective view of the combination rolling transport, separable carry bag, and folding chair device of the present invention showing the seat pivoted down for use and the carry bag in place on the bottom support.
Figure 2:
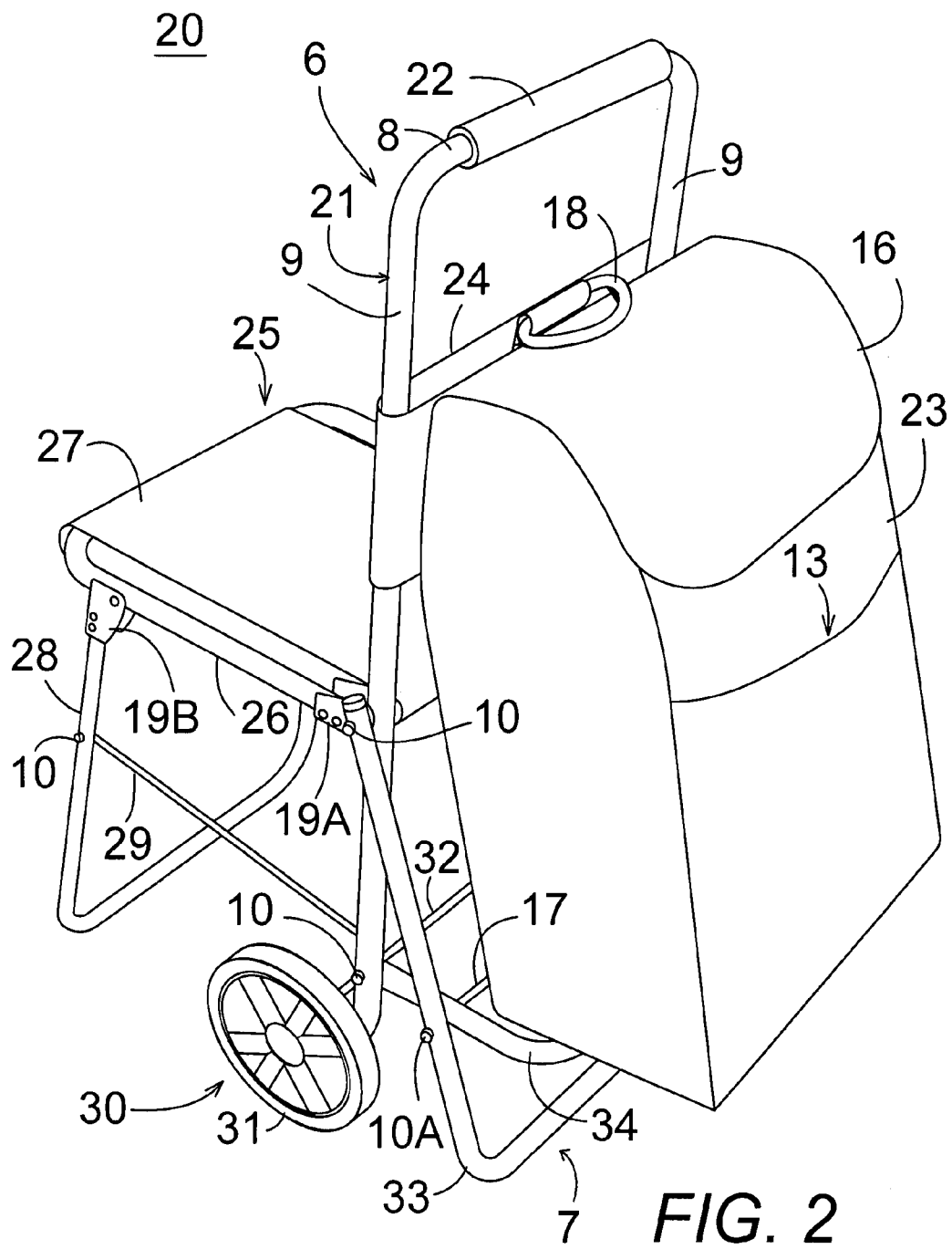
FIG. 2 is a perspective view of the device of FIG. 1 turned around with a full load in the carry bag and the seat down.
Figure 3:
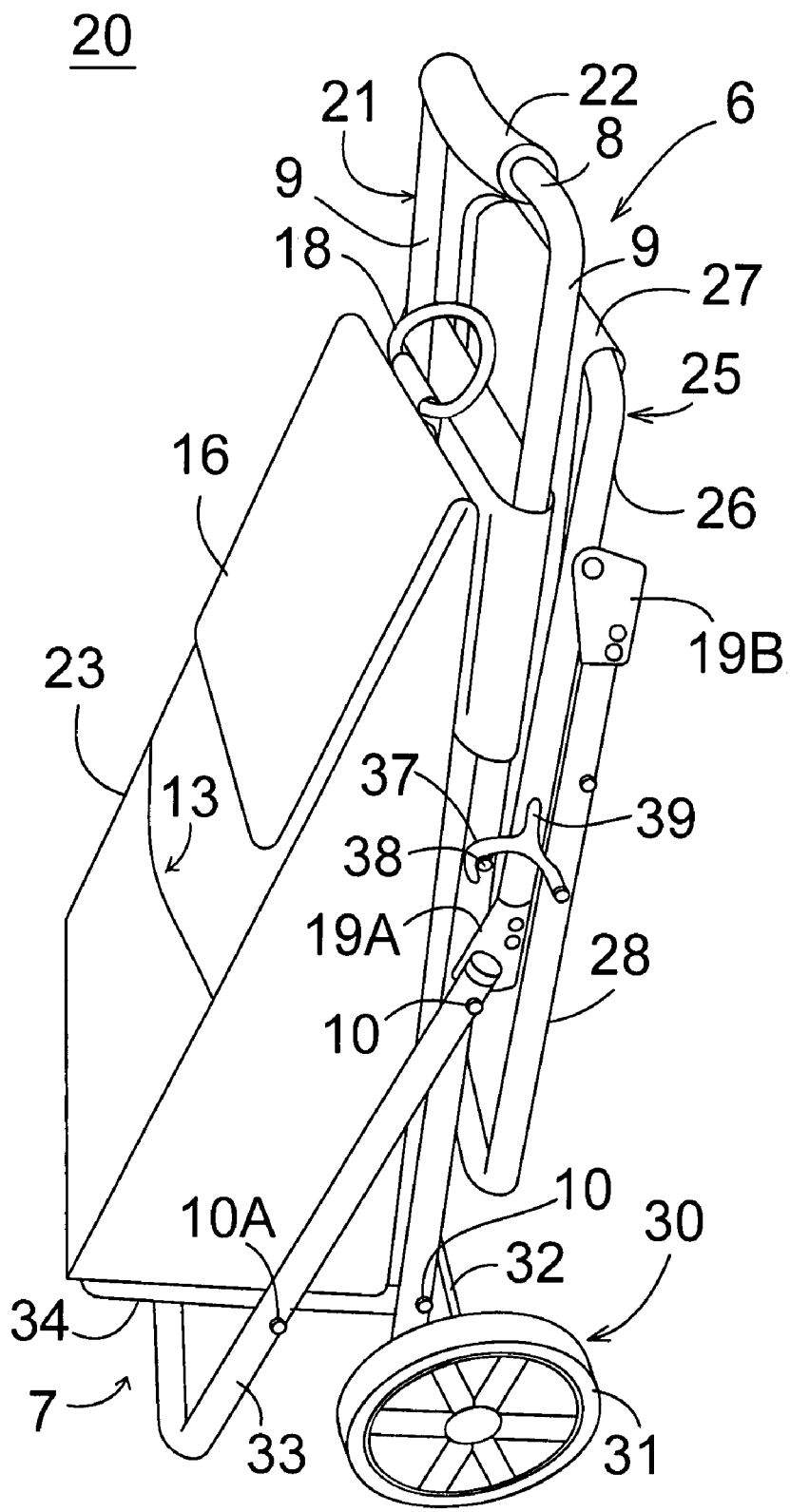
FIG. 3 is a perspective view of the device of FIG. 1 showing the seat pivoted up for transport and the carry bag in place on the bottom support.
Figure 4:
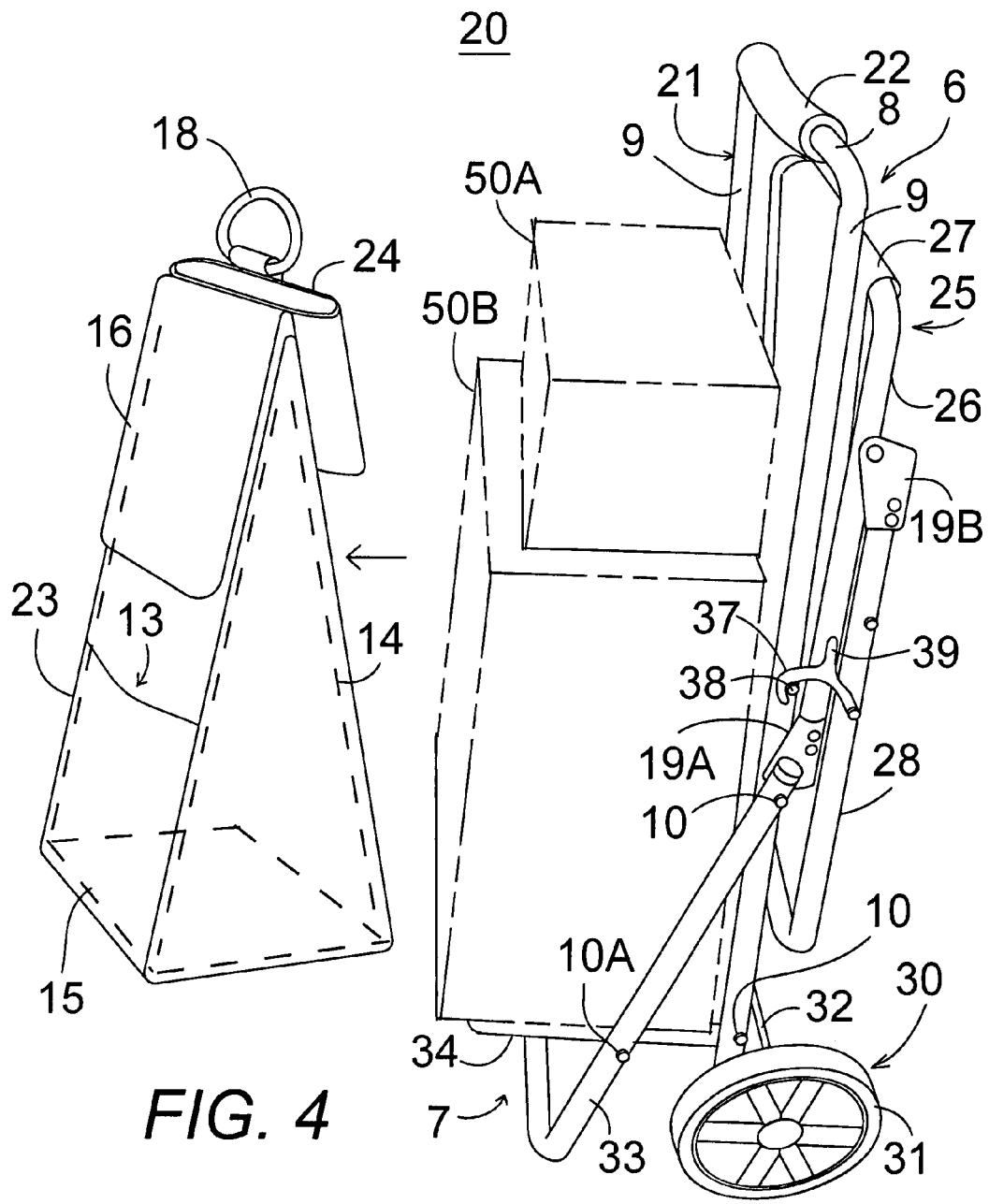
FIG. 4 is an exploded perspective view of the device of FIG. 1 showing the seat pivoted up for transport and the carry bag removed from the frame with boxes loaded onto the bottom support for transport.
Figure 5:
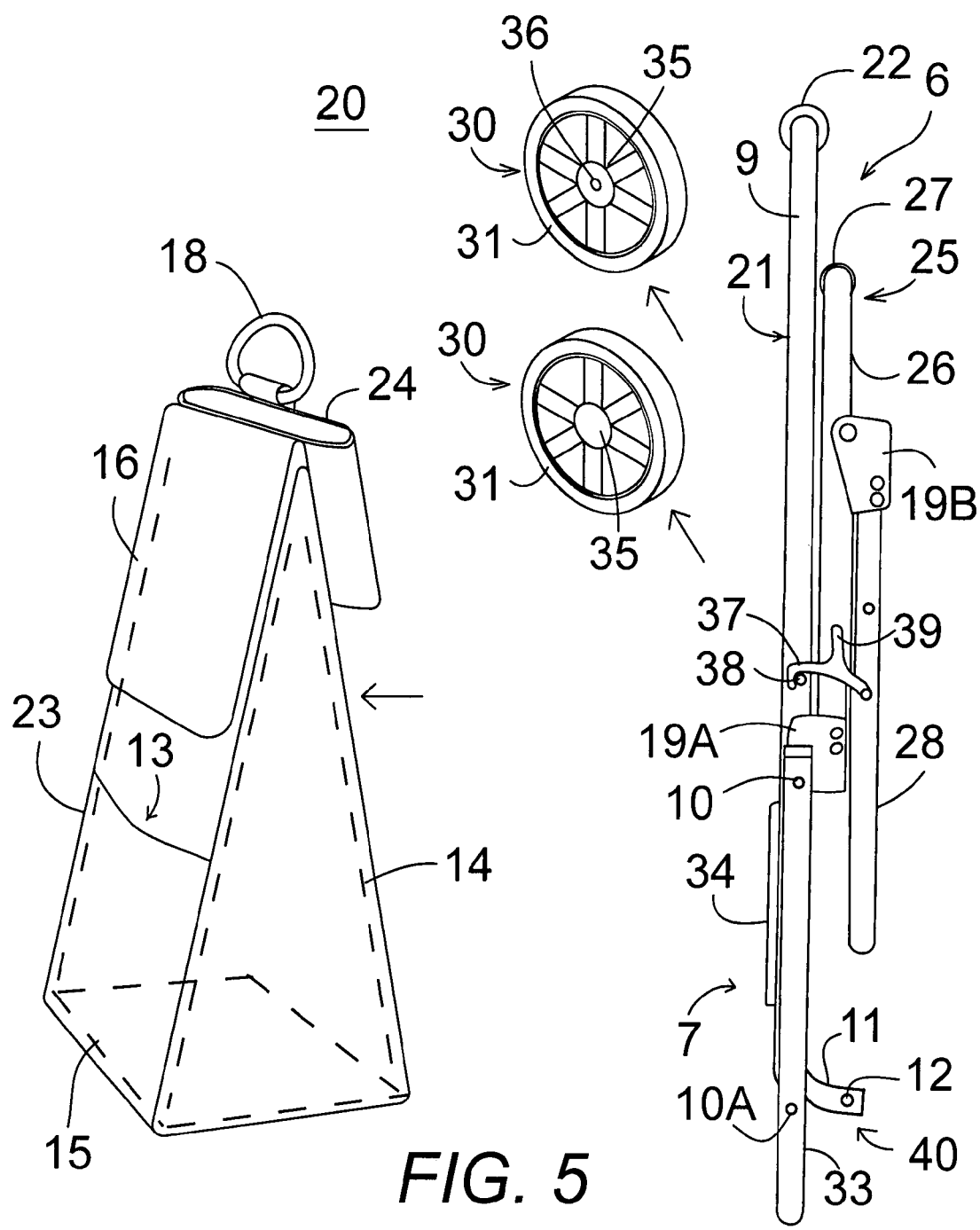
FIG. 5 is an exploded perspective view of the device of FIG. 1 showing the seat pivoted up and the bottom support pivoted in so the frame shown in side view is flat for storage with the carry bag and wheels removed from the frame.

In FIGS. 1-5, a combined fold-up rolling transport and seating device 20 comprises a collapsible frame 6 composed of a main frame member 21 with a fold out seat frame member assembly 25 on one side for sitting in a stationary position, as shown in FIGS. 1 and 2, and a bottom support frame member 34 and stabilizing frame member 33 for holding the device upright in a stationary position and for supporting the bottom support frame member 34 for transporting loads in a carry bag 23 positioned on the support frame member 34, as shown in FIG. 3 or alternately transporting other items, such as boxes 50A and 50B, as shown in FIG. 4. The frame members pivot together for flat storage with the wheels 30 and carry bag 23 removed, as shown in FIG. 5.

An inverted square U-shaped main frame member 21 comprises a top horizontal cross bar 8 at least partially covered with a shock absorbing hand grip 22, two vertical structural elements 9 extending downward from the ends of the horizontal cross bar 8, and a wheel receiving element 40, as shown in FIG. 5, at the bottom of each of the vertical structural elements 9. Each of the vertical structural elements 9 has spaced mating holes along the length of each of the vertical structural elements 9 for receiving a series of pivot elements 10 therein.

The fold-up seat frame member assembly 25 comprises a square U-shaped horizontal seat frame 26 covered by a fabric 27 and connected by a pivot element 19A to each of the vertical structural elements 9, a square U-shaped vertical leg support frame 28 connected by a pair of pivot elements 19B to a front of the seat frame 26, and a pair of support frame stabilizing members 29 connected between the vertical elements 9 and the leg support frame 28 by pivot elements. The seat frame member assembly 25 has at least one means, preferably a hook 37 with a handle 39 on the leg support frame 28 that can be removably hooked over a protruding pin 38 on the main frame member 9, for removably locking the seat frame member assembly 25 to the main frame member 21, allowing the seat frame member assembly 25 to lock onto the vertical structural element 9 for use in transporting, as shown in FIGS. 4 and 5. When not folded flat for transporting items, the seat frame member assembly 25 pivots down from a first side of the main frame member to form a seat for a user in a stationary position, as shown in FIGS. 1 and 2.

A fold-up bottom support frame member assembly 7 comprises a square U-shaped horizontal support frame member 34 connected by a pivot element 10 to each of the vertical structural elements 9, and an inverted square U-shaped angled stabilizing frame member 33 connected by a pivot element 10 to each of the vertical structural elements 9 and connected by retractable pivot elements 10A to the bottom support frame member 34 to allow both the support frame member 34 and the stabilizing frame member 33 to pivot into alignment with the main frame member 21 for storage and alternately to allow the stabilizing frame member 33 to pivot out at an angle from a second side of the main frame member 21 opposite the seat frame member assembly 25 to support the carry bag 23, as shown in FIG. 3, and without the carry bag alternately support heavy items, such as boxes 50A and 50B, as shown in FIG. 4, for transport. The stabilizing frame member 33 contacts the ground to stabilize the main frame and allow the main frame to stand in an upright position, as shown in FIGS. 1-4, and to support the support frame member 34 when pivoted down from the second side of the main frame 21 into a horizontal orientation to support items placed on the support frame member 34 for transport. A cross support member 17 on the bottom support member 34 gives additional support for items placed on the bottom support member.

In a preferred embodiment, all the frame members are fabricated of light weight aluminum tubes with heavy duty construction to support heavy loads, and the frame members pivot into alignment to four inches flat with the wheels removed for compact storage, as shown in FIG. 5.

A pair of removable wheels 30 each comprises a resilient outer tire portion 31 for absorbing shock. The tire portion is attached to a lightweight structural hub 35 with a mating opening 36 for removably snap fitting on one of the wheel receiving elements 40 as shown in FIG. 5, so that the wheels snap on for transport, as shown in FIGS. 3 and 4, and snap off for storage with the frame members folded flat, as shown in FIG. 5. The pair of removable wheels each has a diameter sufficiently large to facilitate smooth rolling over sidewalk curbs and stairs. A cross support or axle 32 between the two removable wheels 30 adds support and stability to the wheels. in a preferred embodiment, each of the wheels 30 is fabricated of a shock absorbing synthetic rubber tire on a lightweight sturdy rim and hub.

A carry bag 23 supported by the bottom support 34, as shown in FIGS. 1-3, transports items stored in the bag with the bag on the bottom support member 34, and alternately may be carried separately from the collapsible frame, as shown in FIGS. 4 and 5. The carry bag 23 has a waterproof outer shell with a large top opening covered by a closable flap 16 to keep items dry while transporting the items. A stiff internal support frame 14, preferably heavy wire, prevents the carry bag from folding inward, thereby allowing for easy loading and unloading. A top carrying handle 18 allows for using the carry bag separately. A mounting loop 24 of material on the back of the bag slides over the main frame member 21 to support the bag in an upright position and serve as a back rest for the fold-up seat, as shown in FIGS. 1 and 2. An internal bottom reinforcement 15 maintains a flat bottom of the bag for resting on the horizontal support frame member 34. The internal bottom reinforcement 15 is preferably a heavy duty plastic base. In a preferred embodiment, the carry bag also has a wide pocket 13 on the front of bag for carrying small items.

In FIG. 5, the wheel receiving element 40 at the bottom of each of the vertical structural elements 9 comprises a bottom curved end 11 of each vertical structural element curving out from the first side of the main frame member in the direction of the tilt of the device when transporting items, and a protruding axle element 12 which snap fits into a mating opening 36 in the hub 35 of one of the wheels 30. When the device is in use as a hand truck, either with the carry bag, or to carry separate items, the main frame member 21 is angled away from the load so that the curve of the bottom curved ends 11 elevates the frame and the load above the wheels 30 allowing the main frame member 21 to clear sidewalk curbs and stairs.

In use, the device of the present invention has several functions. The user may operate the device with the carry bag 23 attached, for transporting smaller, loose items within the bag, or alternately without the carry bag, as hand truck for transporting heavy or bulky items such as boxes 50A and 50B, shown in FIG. 4. The user may also fold down the seat assembly 25 and use the device as a chair, with the sleeve 24 of the carry bag 23 acting as a backrest for the chair. When not in use, the entire assembly can be folded flat for storage, as shown in FIG. 5. When used as a chair, the seat assembly 25 is unlocked from the main frame 21 by releasing the hook 37 from the protruding pin 38 on the main frame vertical member 9 and folded down to a horizontal position, allowing the leg assembly 28 to pivot to a perpendicular orientation to the seat. When the seat is locked to the main frame 21 in a vertical position, the device may be used as a rolling transport, by folding the bottom support member 34 out from the main frame so the bottom support member is perpendicular to the main frame, and the stabilizing member is pivoted away from the main frame and locked in place with the retractable pivot elements 10A to the bottom support frame member 34. When the stabilizing member is locked in place, the user either loads the device with large items, such as boxes 50A and 50B, or slides the carry bag 23 over the main frame 21 to carry smaller, loose items, such as groceries. The user may also be use the carry bag 23 separately by sliding it off the main frame and using the handle 18 to carry it. In order to store the device flat in a very small amount of space, the user will slide the carry bag 23 off the main frame, fold the frame and seat members flat, and snap off the wheels 30.

It is understood that the preceding description is given merely by way of illustration and not in limitation of the invention and that various modifications may be made thereto without departing from the spirit of the invention as claimed.

What is claimed is:

1. A combined fold-up rolling transport and seating device comprising in combination:

a collapsible frame comprising a number of frame members interconnected by means for pivoting the frame members open for use and pivoting the frame members into alignment for flat storage, the frame members comprising:

an inverted square U-shaped main frame member comprising a top horizontal cross bar at least partially covered with a shock absorbing hand grip, two vertical structural elements extending downward from the ends of the horizontal cross bar, each of the vertical structural elements having spaced mating holes along the length of each of the vertical structural elements for receiving a series of pivot elements therein, and a wheel receiving element at the bottom of each of the vertical structural elements;

a fold-up seat frame member assembly comprising a fabric covered square U-shaped horizontal seat frame connected by a pivot element to each of the vertical structural elements, a square U-shaped vertical leg support frame connected by a pair of pivot elements to a front of the seat frame, and a pair of support frame stabilizing members connected between the vertical elements and the leg support frame by pivot elements, at least one means for removably locking the seat frame assembly to at least one vertical structural element so that the seat frame member assembly locks onto the at least one vertical structural element for use in transporting and the seat frame member assembly pivots down from a first side of the main frame member to form a seat for a user in a stationary position;

a fold-up bottom support frame member assembly comprising a square U-shaped horizontal support frame member connected by a pivot element to each of the vertical structural elements and an inverted square U-shaped angled stabilizing frame member connected by a pivot element to each of the vertical structural elements and connected by retractable pivot elements to the bottom support frame member to allow both the support frame member and the stabilizing frame member to pivot into alignment with the main frame member for storage and alternately to allow the stabilizing frame member to pivot out at an angle from a second side of the main frame member to contact the ground to stabilize the main frame and allow the main frame to stand in an upright position and to support the support frame member pivoted down from the second side of the main frame in a horizontal direction to support items placed on the support frame member for transport;

a pair of removable wheels each comprising a resilient outer tire portion for absorbing shock, the tire portion attached to a lightweight structural hub with a center means for removably snap fitting on one of the wheel receiving elements so that the wheels snap on for transport and snap off for storage with the frame members folded flat, the pair of removable wheels each having a diameter sufficiently large to facilitate smooth rolling over sidewalk curbs and stairs;

a carry bag supported by the bottom support for transporting items stored in the bag and alternately carried separately from the collapsible frame, the carry bag comprising a waterproof outer shell having a large top opening covered by a closable flap to keep items dry while transporting the items, a stiff internal support frame to prevent the carry bag from folding inward for easy loading and unloading, a top carrying handle for separate use of the carry bag, and a mounting loop of material on the back of the bag which slides over the main frame member to support the bag in an upright position and serve as a back rest for the fold-up seat, and an internal bottom reinforcement to maintain a flat bottom of the bag for resting on the horizontal support frame member.

2. The device of claim 1 wherein the carry bag further comprises a wide pocket on front of bag for carrying small items.

3. The device of claim 1 wherein the stiff internal support frame in the carry bag comprises large gauge wires along the vertical edges on the interior of the carry bag.

4. The device of claim 1 wherein the internal bottom reinforcement in the carry bag comprises a heavy duty plastic base for added reinforcement on the bottom of the bag.

5. The device of claim 1 wherein the wheel receiving element at the bottom of each of the vertical structural elements comprises a bottom curved end of each vertical structural element curving out from the first side of the main frame member in the direction of a tilt of the device when transporting items, and a protruding axle element which snap fits into a mating opening in the hub of one of the wheels so that when the device is in use as a hand truck, the main frame member is angled away from the load so that the curve of the bottom curved ends elevates the frame and the load above the wheels allowing the main frame member to clear sidewalk curbs and stairs.

6. The device of claim 1 wherein the means for removably locking the seat frame assembly to at least one vertical structural element comprises at least one hook on the leg support frame removably hooked over a protruding pin on the main frame member.

7. The device of claim 1 wherein each of the wheels is fabricated of a shock absorbing synthetic rubber tire on a lightweight sturdy rim and hub.

8. The device of claim 1 wherein the frame members are fabricated of light weight aluminum tubes with heavy duty construction to support heavy loads.

9. The device of claim 1 wherein the frame members pivot into alignment to four inches flat with the wheels removed for compact storage.

\* \* \* \* \*